(12) United States Patent
Goyal et al.

(10) Patent No.: US 10,757,053 B2
(45) Date of Patent: Aug. 25, 2020

(54) HIGH CONFIDENCE DIGITAL CONTENT TREATMENT

(71) Applicant: Microsoft Technology Licensing, LLC, Redmond, WA (US)

(72) Inventors: Vineet Goyal, Bengaluru (IN); Sachin Kakkar, Karnataka (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 442 days.

(21) Appl. No.: 15/447,737

(22) Filed: Mar. 2, 2017

(65) Prior Publication Data

US 2018/0255010 A1 Sep. 6, 2018

(51) Int. Cl.
| | |
|---|---|
| *H04L 29/06* | (2006.01) |
| *G11B 20/00* | (2006.01) |
| *G06F 21/10* | (2013.01) |
| *H04L 12/58* | (2006.01) |
| *H04L 29/08* | (2006.01) |

(52) U.S. Cl.
CPC .......... *H04L 51/12* (2013.01); *H04L 63/1441* (2013.01); *H04L 51/32* (2013.01)

(58) Field of Classification Search
CPC ...... H04L 51/12; H04L 51/32; H04L 63/1441
USPC ....................................................... 709/206
See application file for complete search history.

(56) References Cited

U.S. PATENT DOCUMENTS

| | | | | |
|---|---|---|---|---|
| 6,507,866 B1 * | 1/2003 | Barchi | ................. | G06Q 10/107 709/207 |
| 8,046,832 B2 * | 10/2011 | Goodman | ............... | H04L 51/12 709/206 |
| 8,560,619 B1 * | 10/2013 | Huston | ................ | G06Q 10/107 709/206 |
| 8,738,721 B1 * | 5/2014 | Smirnov | .............. | G06Q 10/107 709/206 |
| 8,918,473 B1 * | 12/2014 | O'Connor | ............... | H04L 67/02 709/206 |

(Continued)

OTHER PUBLICATIONS

"Applicant Initiated Interview Summary Issued in U.S. Appl. No. 15/688,275", dated Jul. 25, 2019, 3 Pages.

(Continued)

*Primary Examiner* — Kevin T Bates
*Assistant Examiner* — Golam Mahmud
(74) *Attorney, Agent, or Firm* — Schwegman Lundberg & Woessner, P.A.

(57) ABSTRACT

A machine may be configured to perform high confidence digital content treatment. For example, the machine accesses a message reported as objectionable by a member of a Social Networking Service (SNS). The machine identifies a digital content item included in the message reported as objectionable based on pre-processing the message. The machine determines one or more degrees of similarity between the digital content item and one or more other digital content items included in one or more other messages previously reported as objectionable by members of the SNS. The machine generates a final score value associated with the digital content item based on the one or more degrees of similarity values between the digital content item and one or more other digital content items. The machine executes a treatment for the message reported as objectionable based on the final score value associated with the content of the message.

19 Claims, 13 Drawing Sheets

(56) References Cited

U.S. PATENT DOCUMENTS

| | | | |
|---|---|---|---|
| 9,396,475 B2 | 7/2016 | Cristofalo et al. | |
| 10,116,614 B1* | 10/2018 | Rihn | H04L 51/12 |
| 2004/0073617 A1* | 4/2004 | Milliken | G06F 21/562 |
| | | | 709/206 |
| 2004/0215977 A1* | 10/2004 | Goodman | H04L 51/12 |
| | | | 726/22 |
| 2005/0135380 A1* | 6/2005 | Sahita | G06F 40/205 |
| | | | 370/395.32 |
| 2005/0204005 A1 | 9/2005 | Purcell et al. | |
| 2006/0036693 A1* | 2/2006 | Hulten | H04L 51/12 |
| | | | 709/206 |
| 2007/0100951 A1* | 5/2007 | Bae | H04L 51/24 |
| | | | 709/206 |
| 2009/0113001 A1* | 4/2009 | Manning | H04L 51/12 |
| | | | 709/206 |
| 2010/0174788 A1 | 7/2010 | Vitaldevara et al. | |
| 2012/0028606 A1* | 2/2012 | Bobotek | H04L 51/28 |
| | | | 455/411 |
| 2013/0091147 A1* | 4/2013 | Kim | G06Q 30/00 |
| | | | 707/748 |
| 2013/0097261 A1* | 4/2013 | Baer | H04L 51/12 |
| | | | 709/206 |
| 2013/0133038 A1* | 5/2013 | DeLuca | H04L 63/083 |
| | | | 726/4 |
| 2014/0236956 A1* | 8/2014 | Matsuura | G06F 16/9535 |
| | | | 707/740 |
| 2015/0032824 A1* | 1/2015 | Kumar | G06F 3/0482 |
| | | | 709/206 |
| 2015/0113651 A1* | 4/2015 | Kim | H04L 51/32 |
| | | | 726/24 |
| 2015/0236995 A1* | 8/2015 | Hammer | H04L 51/28 |
| | | | 709/206 |
| 2015/0302886 A1* | 10/2015 | Brock | H04L 63/0263 |
| | | | 726/32 |
| 2016/0359782 A1* | 12/2016 | Son | H04L 51/12 |
| 2017/0005962 A1* | 1/2017 | Lewin-Eytan | H04L 51/12 |
| 2017/0177337 A1* | 6/2017 | Golan | G06Q 30/0277 |
| 2018/0081991 A1* | 3/2018 | Barber | G06F 16/353 |
| 2019/0068535 A1 | 2/2019 | Goyal et al. | |

OTHER PUBLICATIONS

"Non Final Office Action Issued in U.S. Appl. No. 15/688,275", dated Apr. 19, 2019, 8 Pages.

"Non Final Office Action Issued in U.S Appl. No. 15/688,275", dated Apr. 16, 2020, 10 Pages.

* cited by examiner

HIGH CONFIDENCE DIGITAL CONTENT TREATMENT

TECHNICAL FIELD

The present application relates generally to systems, methods, and computer program products for high confidence digital content treatment.

BACKGROUND

Email spam, also known as unsolicited bulk email, or junk mail, has become a problem soon after the general public started using the Internet in the mid-1990s. Unsolicited messaging is not limited to email. Examples of other types of spam are: instant messaging spam, Usenet newsgroup spam, web search engine spam, online classified ads spam, mobile phone messaging spam, internee forum spam, etc.

In some instances, providers of email services allow users to report the receipt of spam messages. Based on a spam report received from a user, a representative of the email service provider investigates the content of the reported spam message to determine if the message is indeed spam or is simply offensive to the particular user. If the reported message is determined to be spam, the email service provider may choose to block future messages from the sender of the spam message (also known as a "spammer").

Because a large portion of the reported messages turns out not to be spam, human review of reported messages can be very wasteful of man-hours. In addition, the human review of reported spam messages tends to be very slow, and in the time that a person analyzes a reported message to determine if it is junk mail, the spammer may inundate an email service (or the Inboxes of the users of the email service) with thousands of unsolicited messages.

BRIEF DESCRIPTION OF THE DRAWINGS

Some embodiments are illustrated by way of example and not limitation in the figures of the accompanying drawings, in which.

DETAILED DESCRIPTION

Figure 1:
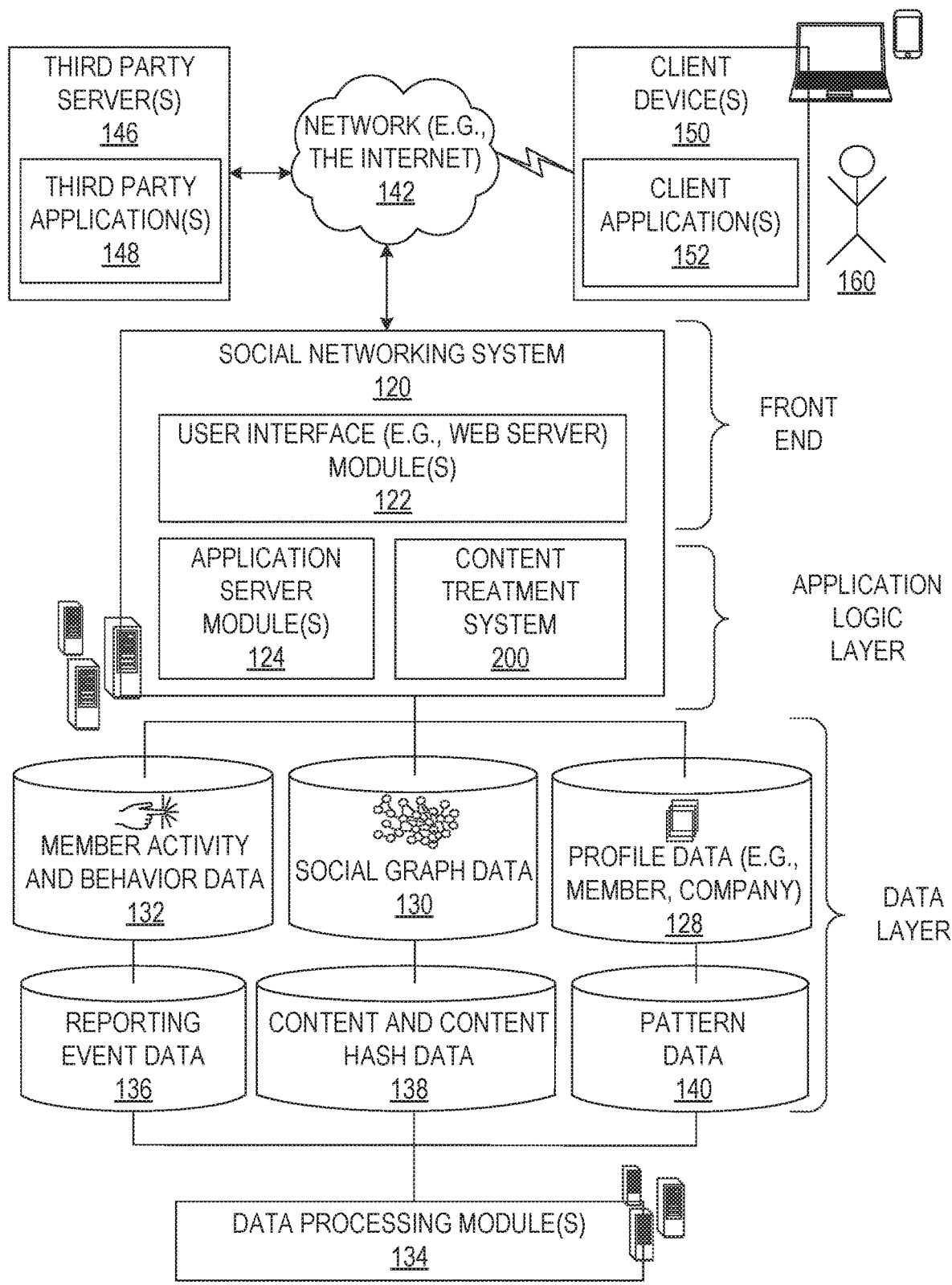
FIG. 1 is a network diagram illustrating a client-server system, according to some example embodiments.

Example methods and systems for high confidence digital content treatment on a Social Networking Service (hereinafter also "SNS"), such as LinkedIn®, are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

In some example embodiments, members of the SNS receive digital content via various services provided on the SNS. Some of that digital content is found objectionable by the receiving members. For example, a member of the SNS receives objectionable digital content in an Inbox provided by the SNS for the member. The objectionable digital content may be a spam message sent to the one or more members by a spam sender. The spam sender may be another member of the SNS, or a user who is not a member of the SNS.

Spamming is economically viable for the spammers because, although creating new content is expensive, re-using content by mass-distributing it is associated with minimal costs to the spammers. Therefore, spammers tend to re-use digital content, and in some instances, create slight variations of the digital content (e.g., the name of the recipient, email address, phone number, subject, etc. However, the spam not only is objectionable to many members of the SNS who receive the digital content, but also causes increased consumption of computer and network resources. Accordingly, it may be technologically beneficial to implement a system associated with the SNS that performs high confidence treatment of objectionable digital content. An example of such high confidence treatment of objectionable digital content is pre-processing of messages flagged as objectionable by the members of the SNS, identifying and aggregating similar flagged digital content to either reduce the volume of digital content that requires human review or to block (e.g., to take down) the digital content that is determined to be associated with a plurality of indicators (e.g., signals) pointing to the digital content being spam.

According to some example embodiments, a system associated with the SNS allows members who receive messages that they find objectionable to report such messages to the system. A member of the SNS may flag an objectionable message by, for example, selecting an objectionable message indicator (e.g., a button) in a user interface of a client device. As a result of the member selecting the objectionable message indicator, the system may generate a reporting event associated with the objectionable message. Based on the reporting event, the system may analyze the objectionable message to identify and execute a treatment for it.

A member can flag digital content for multiple reasons, such as the digital content is considered adult content, the digital content is an unsolicited advertising, or the member simply does not like the content. However, an item of content that is objectionable to a member may not, in itself, be considered spam, or even considered objectionable by another member. Although an objectionable message report by a member of the SNS may be one input signal (e.g., a flag) in determining whether the reported message is spam, a single report, by itself, may not provide sufficient data for a machine-based determination whether the reported message includes content that warrants being filtered out from being delivered to members of the SNS. Additional data pertaining to the content of the reported message, and to whether the reported message is a near-duplicate of previously reported messages may be helpful in identifying an appropriate treatment for the reported message.

In some example embodiments, a content treatment system automatically determines the treatment for a digital content item associated with a reporting event based on automatic aggregation and analysis of various input signals (e.g., values) pertaining to the digital content item. Examples of treatments are de-ranking the item of digital content, hiding the item of digital content, limiting the distribution of the item of digital content, taking down the item of digital content, or blocking digital content associated with the identifiers (e.g., a member identifier (ID), an IP address, a domain name, etc.) of the author or sender of the item of digital content.

The machine-performed analysis of various input data pertaining to the messages reported as objectionable provides various technological benefits. Examples of such technological benefits are improved data processing times of one or more machines of the content treatment system, and more efficient data storage as a result of minimizing storage of spam content.

According to some example embodiments, the content treatment system accesses a message reported as objectionable (hereinafter also "a reported message," "a flagged message," or "an objectionable message") by a member of a Social Networking Service (SNS) at a record of a database. The accessing of the message reported as objectionable by the member may be based on accessing a reporting event received in a communication from a client device. The communication may pertain to the message reported as objectionable by the member. The client device may be associated with the member.

The content treatment system identifies a digital content item included in the message reported as objectionable based on pre-processing the message. In some instances, the identifying of the digital content item based on the pre-processing of the message includes: removing Personal identifiable Information (PII) from the message reported as objectionable, the removing of the PII resulting in a PII-free message, and performing a canonicalization operation on the PII-free message, the performing of the canonicalization operation resulting in the digital content item. Example of PII are a receiver's name, the receiver's email address, the receiver's phone number, and other personal or private information. Canonicalization (e.g., standardization or normalization) of a digital content item may include converting data that has more than one possible representation into a standard or canonical form.

The content treatment system determines one or more degrees of similarity between the digital content item and one or more other digital content items included in one or more other messages previously reported as objectionable by members of the SNS. The determining may be based on comparing a content of the digital content item and a content of the one or more other digital content items. The content treatment system generates a final score value associated with the digital content item based on the one or more degrees of similarity values between the digital content item and one or more other digital content items. The content treatment system executes a treatment for the message reported as objectionable based on the final score value associated with the content of the message.

In some example embodiments, before executing the treatment for the message reported as objectionable, the content treatment system accesses one or more treatment threshold values at a record of a database, compares the final score value and the one or more treatment threshold values, and selects the treatment based on the comparing of the final score value and the one or more treatment threshold values.

in various example embodiments, the one or more degrees of similarity between the digital content item and the one or more other digital content items are represented by one or more probabilities that the digital content item is a near-duplicate of the one or more other digital content items. In some instances, to determine the one or more degrees of similarity between the digital content item and the one or more other digital content items, the content treatment system generates one or more hashes of the digital content item based on performing locality-sensitive hashing of the digital content item, and generates the one or more probabilities that the digital content item is the near-duplicate of the one or more other digital content items based on matching the one or more hashes of the digital content item and one or more hashes associated with the one or more other digital content items.

In some instances, to determine the one or more degrees of similarity between the digital content item and the one or more other digital content items, the content treatment system generates one or more patterns of objectionable digital content based on an analysis of the one or more other digital content items, and generates the one or more probabilities that the digital content item is the near-duplicate of the one or more other digital content items based on matching one or more portions of the digital content item and the one or more patterns of objectionable digital content included in the one or more other digital content items.

The one or more probabilities that the digital content item is the near-duplicate of the one or more other digital content items may be input values in the computation of the final score associated with the digital content item.

The determining that the digital content item is a near-duplicate of one or more previously reported (or flagged as Objectionable) messages may include matching the one or more hashes of the digital content item and one or more further hashes associated with the previously reported message. In some example embodiments, the generation and matching of a plurality of hashes for a digital item serves as basis for identifying near-duplicates, as opposed to identifying an exact match of the item. The content treatment system may, in various example embodiments use a locality sensitive hash (LSH) model, a mini-lash model, a Jaccard similarity model, or a suitable combination thereof, to identify syntactic near-duplicates of a given digital content item (e.g., a newly received text message or email message, etc.) from one or more other items of objectionable digital content already stored in a database associated with the content treatment system.

For example, LSH hashing generates a unique "fingerprint" that uniquely identifies a particular message. If two unique LSH fingerprints associated with two messages match to a certain high degree (e.g., 80%) then the content treatment system determines that the two messages are similar to that certain level (e.g., 80%). The high degree of similarity provides a high degree of confidence that the two messages are near-duplicates.

in addition to performing syntactic analysis of the reported message, the content treatment system also may perform semantic analysis of the reported message in order to determine whether it is a near-duplicate match of a previously reported message. The semantic analysis may include a translation of the digital content item from one or more languages to a canonical form (e.g., English).

In some instances, the generating of one or more patterns of objectionable digital content includes parsing previous objectionable messages (e.g., money fraud, scam, or promotional messages), and extracting keywords, expressions (e.g., regular expressions (regex)), etc. that define search patterns. Examples of pattern of objectionable digital content are: "My sincere apologies for this unannounced approach," "I would like you to contact me via my email address," "Please send me your phone number for further details," "I have a business proposal, Kindly contact my email," etc.

In some example embodiments, the content treatment system also determines the number of patterns matched, the number of times each pattern was matched, or both. In some instances, the content treatment system utilizes this information in the generating of score values for various digital content items and the determining of the appropriate treatment for digital content items based on the score values associated with the various digital content items.

According to some example embodiments, the utilization of various near-duplication detection models (e.g., a hash model, a pattern model, a machine learning model, an image classification model, etc.), solely or in combination, increases the machine-determined confidence level that a certain reported digital content item is or is not a spam message.

In certain example embodiments, the content treatment system may also compute score values for reported items of digital content based on determinations made using various near-duplication detection models (e.g., a hash model, a pattern model, a machine learning model, an image classification model, etc.) with regard to the reported items of digital content. The score values associated with the reported items of digital content may be used in the determination of the treatments to be applied to the reported items of digital content.

According to some example embodiments, every pattern is assigned a weight value Wi (with values between 0.00 and 1.00) which was determined offline based on how many times this pattern appeared in spam messages received at the SNS (e.g., messages which are determined to be spam, and labelled as such by human reviewers). The weigh Wi represents a degree of severity (e.g., offense, harm, etc.) of a particular pattern.

In some example embodiments, the content treatment system determines a base score value of a flagged message to be:

$$S\_base_i = (W_1 + W_2 + \ldots W_i)/(\text{Total number of patterns matched}),$$

where $W_i$ is the weight value of a particular pattern that matches a pattern in the digital content item.

The value of the S_base$_i$ score is stored in association with every flagged message in a record of a database.

The content treatment system also generates a final score value associated with the digital content item that serves as a basis for the selection and execution of a treatment for the message reported as objectionable. When the digital content item included in a flagged message is matched (e.g., syntactically and/or semantically) against one or more other digital content items included in one or more previously stored flagged messages, the content treatment system determines one or more degrees of similarity $S_i$ (with values between 0.00 and 1.00) between the digital content item and the one or more other digital content items.

In some example embodiments, the content treatment system determines the final score value associated with the digital content item based on the one or more degrees of similarity values between the digital content item and one or more other digital content items using the following formula:

$$S\_final_i = (S_1 * S\_base_1 + S_2 * S\_base_i)/(\text{Total number of previously stored, similar flagged messages found}).$$

where $S_i$ is the degree of similarity value between the digital content item and another digital content item that was included in a previously reported message, and S_base$_i$ is the base score value of the other digital content item that was included in the previously reported message.

According to various example embodiments, the treatment of newly reported objectionable digital content (e.g., a new Inbox message) item is based on the final score value generated for it. The treatments may range from low severity to high severity. In some instances, each treatment action is associated with a corresponding threshold value in the range between "0.00" and "1.00." A higher threshold value may represent a higher severity of treatment, and a lower threshold value may represent a lower severity of treatment. For example, a "Block the message" treatment action is associated with the highest threshold value of "1.00," while a "No action" treatment action is associated with the lowest threshold value of "0.00." In some example embodiments, some control statements may be represented as following:

```
if (S_final_i > H_1)
    T_1;
else if (S_final_i > H_2)
    T_2;
...
else if (S_final_i > H_n)
    T_n,
``` where S_final$_i$ is the final score value associated with a digital content item included in a newly reported message, and $H_i$ are the threshold values corresponding to treatments $T_i$.

Example filtering treatments, with increasing levels of severity, include: (a) no action on the similar content, but store it for future match against flagged content similar to this; (b) send it for human review to check if similar content needs to be treated; (c) provide a warning header to every message that is similar to this content; (d) take down all similar content by moving it to a "Spam/Blocked" folder, and send it for human review to check it needs to be cleared; (e) take down all similar content by moving it to a "Spam/Blocked" folder (e.g., auto-block).

An example method and system for high confidence digital content treatment may be implemented in the context of the client-server system illustrated in FIG. 1. As illustrated in FIG. 1, the content treatment system 200 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 12.0 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122 generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG, 1, social networking system 120 may include the data migration system 200, which is described in more detail below.

Further, as shown in FIG. 1, a data processing module 134 may be used with a variety of applications, services, and features of the social networking system 120. The data processing module 134 may periodically access one or more of the databases 128, 130, 132, 136, 138, or 140, process (e.g., execute batch process jobs to analyze or mine) profile data, social graph data, member activity and behavior data, reporting event data, content data (e.g., the content of objectionable Inbox messages), content hash data (e.g., hashes of digital content items), or pattern data (e.g., patterns of objectionable digital content), and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2A:
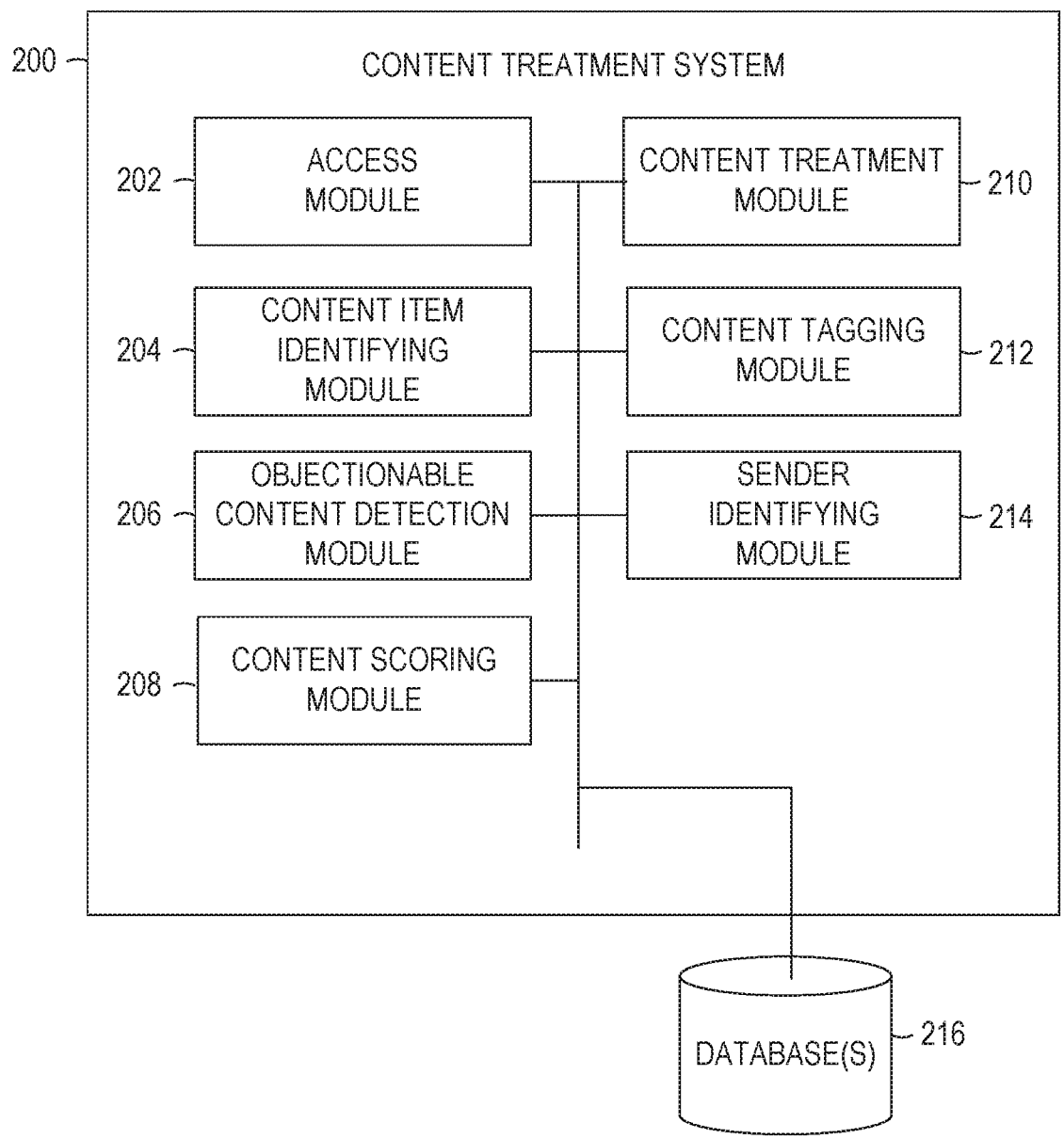
FIG. 2A is a block diagram illustrating components of a content treatment system, according to some example embodiments.

FIG. 2A is a block diagram illustrating components of the content treatment system 200, according to some example embodiments. As shown in FIG. 2A, the content treatment system 200 includes an access module 202, a content item identifying module 204, an objectionable content detection module 206, a content scoring module 208, a content treatment module 210, a content tagging module 212, and a sender identifying module 214, all configured to communicate with each other (e.g., via a bus, shared memory, or a switch).

According to some example embodiments, the access module 202 accesses a message reported as objectionable by a member of a Social Networking Service (SNS) at a record of a database (e.g., database 216). In some example embodiments, the access module 202 accesses a reporting event based on a communication received from a client device associated with the member of the SNS. The communication may pertain to the message reported as objectionable by the member. For example, the member of the SNS may determine that an Inbox message received by the member in the member's Inbox is objectionable (e.g., is a spam message). The member may indicate, via a user interface (e.g., by clicking a user interface button that states "Report as objectionable") displayed on the member's client device, that the message is objectionable to the member. The client device may generate a communication that pertains to objectionable message, and transmit the communication to the content treatment system 200. In some instances, the communication includes a reporting event (e.g., a flagging event) that indicates that the member has designated (e.g., reported, flagged, etc.) the message as objectionable. The communication may also indicate an identifier of the message reported as objectionable. In some example embodiments, the accessing of the message reported as objectionable by the member is based on the identifier of the message reported as objectionable.

The content item identifying module 204 identifies a digital content item included in the message reported as objectionable based on pre-processing the message. In some example embodiments, the identifying of the digital content item based on the pre-processing of the message includes removing Personal Identifiable Information (PII) from the message reported as objectionable, the removing of the PII resulting in a PII-free message, and performing a canonicalization operation on the PII-free message, the performing of the canonicalization operation resulting in the digital content item.

The objectionable content detection module 206 determines that the digital content item is a near-duplicate of a previously-reported objectionable message. In some example embodiments, to determine that the digital content item is a near-duplicate of a previously-reported objectionable message, the objectionable content detection module 206 determines one or more degrees of similarity between the digital content item and one or more other digital content items included in one or more other messages previously reported as objectionable by members of the SNS. In some instances, the one or more other messages previously reported as objectionable include (e.g., are) one or more messages identified (e.g., by a human reviewer, or automatically by a machine) as spam. The determining of the one or more degrees of similarity is based on comparing a content of the digital content item and a content of the one or more other digital content items. According to certain example embodiments, the one or more degrees of similarity between the digital content item and the one or more other digital content items are represented by one or more probabilities that the digital content item is a near-duplicate of the one or more other digital content items.

In some example embodiments, the determining of the one or more degrees of similarity between the digital content item and the one or more other digital content items includes: generating one or more hashes of the digital content item based on performing locality-sensitive hashing of the digital content item, and generating the one or more probabilities that the digital content item is the near-duplicate of the one or more other digital content items based on matching the one or more hashes of the digital content item and one or more hashes associated with the one or more other digital content items (e.g., mapping the one or more hashes of the digital content item to one or more hashes associated with the one or more other digital content items).

In various example embodiments, the determining of the one or more degrees of similarity between the digital content item and the one or more other digital content items includes: generating one or more patterns of objectionable digital content based on an analysis (e.g., textual analysis, image analysis, video analysis etc.) of the one or more other digital content items, and generating the one or more probabilities that the digital content item is the near-duplicate of the one or more other digital content items based on matching one or more portions of the digital content item and the one or more patterns of objectionable digital content included in the one or more other digital content items.

The content scoring module 208 generates a final score value associated with the digital content item based on the one or more degrees of similarity values between the digital content item and one or more other digital content items. In sonic example embodiments, the content scoring module 208 increments a near-duplicate counter value of a near-duplicate counter associated with the one or more other digital content items based on the determining of the one or more degrees of similarity between the digital content item and the one or more other digital content items. The content scoring module 208 may access a near-duplicate threshold value at a record of a database, and may determine that the near-duplicate counter value exceeds a near-duplicate threshold value. In some example embodiments, the content scoring module 208 generates the final score value further based on the determining that the near-duplicate counter value exceeds the near-duplicate threshold value.

In some example embodiments, the content scoring module 208 determines a total number of matched patterns based on matching one or more portions of the digital content item and one or more patterns of objectionable digital content included in one or more other messages previously reported as objectionable. The content scoring module 208 accesses a first weight value associated with a first pattern. The first weight value is determined based on a number of times the first pattern is included in one or more other messages previously reported as objectionable. The content scoring module 208 accesses a second weight value associated with a second pattern. The second weight value is determined based on a number of times the second pattern is included in one or more other messages previously reported as objectionable. The content scoring module 208 aggregates the first weight value and the second weight value. The aggregating results in a sum of the first weight value and the second weight value. The content scoring module 208 generates a base score for the message reported as objectionable based on dividing the sum of the first weight value and the second weight value by the total number of matched patterns. The content scoring module 208 may also associate the base score with the message reported as objectionable in a record of a database.

In some example embodiments, to generate the final score, the content scoring module 208 accesses a near-duplicate counter value at a record of a database. The near-duplicate counter value identifies a total number of detected near-duplicate messages of the message reported as objectionable. The content scoring module 208 generates a first product between a first similarity value that identifies the degree of similarity between the digital content item included in the message reported as objectionable and a first previous digital content item included in a first previously reported message, and a first base score associated with the first previous digital content item. The content scoring module 208 generates a second product between a second similarity value that identifies the degree of similarity between the digital content item and a second previous digital content item included in a second previously reported message, and a second base score associated with the second previous digital content item. The content scoring module 208 aggregates the first product and the second product. The aggregating results in a sum of the first product and the second product. The content scoring module 208 divides the sum of the products by the total number of detected near-duplicate messages of the message reported as objectionable. The dividing results in the final score value.

The content treatment module 210 executes a treatment for the message reported as objectionable based on the final score value associated with the content of the message. In some example embodiments, the content treatment module 210 first identifies a treatment for the digital content item based on the final score value associated with the digital content item. Various final score values associated with various digital content items may result in various treatments for various digital content items (e.g., a first digital content item associated with a low final score value may be sent for review by a human being, a second digital content item associated with a high final score value may be blocked from being displayed in the user interface of the client device, etc.).

According to some example embodiments, the content treatment module 210 accesses one or more treatment threshold values at a record of a database. The content treatment module 210 compares the final score value and the one or more treatment threshold values, and selects the treatment based on the comparing of the final score value and the one or more treatment threshold values.

The content tagging module 212 tags a previously-reported objectionable message as a spam message in a record of a database. The tagging may be based on determining that the near-duplicate counter value exceeds the near-duplicate threshold value.

The sender identifying module 210 identifies a sender identifier associated with the message reported as objectionable based on metadata associated with the message reported as objectionable. In some example embodiments, the content treatment module 210 executes the treatment for the message reported as objectionable further based on the sender identifier.

To perform one or more of its functionalities, the content treatment system 200 may communicate with one or more other systems. For example, an integration system may integrate the content treatment system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 216 (e.g., database 128, 130, 132, 136, 138, or 140).

Figure 2B:
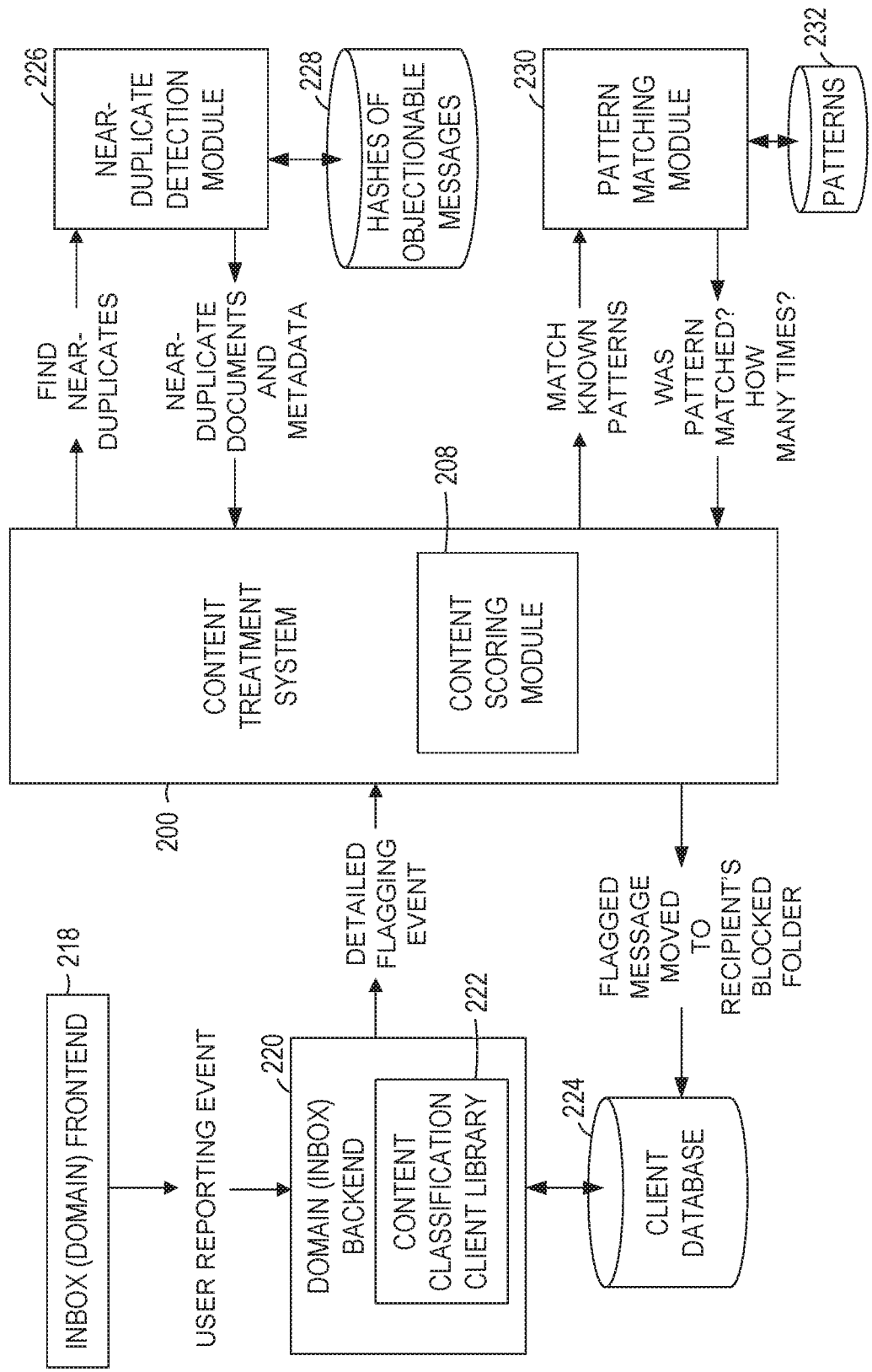
FIG. 2B is a data flow diagram of a content treatment system, according to some example embodiments.

FIG. 2B is a data flow diagram of a content treatment system, according to some example embodiments. As shown in FIG. 213, in some example embodiments, an action by a user (e.g., a member of the SNS) reporting a spam message via an Inbox (Domain) Frontend 218 (e.g., a click on a "report as spam" button in a user interface) of a client device 150 results in the generation of a user reporting event at the Domain (Inbox) Backend 220 of the client device 150. The user reporting event may be stored, by a Content Classification Client Library 222, in a Client Database 224 at the client device 150. The Domain (Inbox_Backend 220 may communicate (e.g., transmit) a detailed flagging event to the content treatment system 200. The detailed flagging event may include various information pertaining to the flagged message (e.g., the content of the message, a sender identifier of the message, a time sent, a time received, a recipient's identifier, etc.

In some example embodiments, the content treatment system 200 includes one or more modules for aggregation of signals pertaining to one or more messages reported as objectionable and/or for classification of digital content based on the various signals, a near-duplicate detection module 226 for the detection of near-duplicate objectionable messages, and a pattern matching module 230 for pattern analysis and matching. The functionality of one or more of the modules illustrated in FIG. 2B may be performed by one or more modules of FIG. 2A described above. For example, the near-duplicate detection module 226 and the pattern matching module 230 may be included in the objectionable content detection module 206 illustrated in FIG. 2A.

Upon accessing the reporting event (e.g., the detailed flagging event shown in FIG. 2B) pertaining to the message reported as objectionable, the content treatment system 200 accesses the reported message at a record of a database (e.g., a database associated with the content treatment system 200, the client database 224 associated with the client device, etc.). The content treatment system 200 identifies a digital content item included in the reported message based on pre-processing the message. The pre-processing of the message may include removing PII from the reported message, and performing a canonicalization operation on the PII-free message. The performing of the canonicalization operation may result in the digital content item.

In some example embodiments, the content treatment system 200 determines how similar the reported message is to one or more other messages that were previously reported as objectionable by members of the SNS. The determining how similar the reported message is to previously reported messages may include determining one or more degrees of similarity between the digital content item and one or more other digital content items included in one or more other messages previously reported as objectionable.

According to some example embodiments, the determining of the one or more degrees of similarity includes generating, by the near-duplicate detection module 226, of one or more hashes of the digital content item (e.g., based on performing locality-sensitive hashing of the digital content item), accessing, by the near-duplicate detection module 226, of one or more other hashes associated with the one or more other messages that were previously reported as objectionable (e.g., at a database 228 of Hashes of Objectionable Messages), mapping, by the near-duplicate detection module 226, of the one or more hashes of the digital content item to the one or more other hashes associated with the one or more other messages that were previously reported as objectionable, and generating, by the near-duplicate detection module 226, of one or more probabilities that the digital content item is a near-duplicate of the one or more other digital content items based on the mapping of the one or more hashes of the digital content item and the one or more other hashes associated with the one or more other digital content items. The near-duplicate detection module 226 may also transmit to another module of the content treatment system 200 a communication that includes the identified near-duplicate documents, and associated metadata for further processing and analysis.

According to various example embodiments, the determining of the one or more degrees of similarity includes accessing one or more other digital content items at a record of a database (e.g., the content and content hash database 138), generating, by the pattern matching module 230, of one or more patterns of objectionable digital content based on an analysis of the one or more other digital content items, and generating, by the pattern matching module 230, of one or more probabilities that the digital content item is a near-duplicate of the one or more other digital content items based on matching one or more portions of the digital content item and the one or more patterns of objectionable digital content included in the one or more other digital content items. The pattern matching module 230 may also transmit to another module of the content treatment system 200 a communication that includes an indication of which known patterns were matched by the one or more portions of the digital content item, and how many times they were matched.

In sonic instances, the one or more patterns of objectionable digital content are generated, and stored in a database 232 of patterns before the reporting event is received from the client device 150 (e.g., before the user reports the objectionable message). The content treatment system 200 may access the one or more patterns of objectionable digital content from the patterns database 232, and may generate the one or more probabilities that the digital content item is a near-duplicate of the one or more other digital content items based on matching one or more portions of the digital content item and the one or more patterns of objectionable digital content included in the one or more other digital content items.

In some example embodiments, the determining of the one or more degrees of similarity includes both the hash-based analysis of the digital content item and the pattern-based analysis of the digital content item described above.

The content treatment system 200 (e.g., the content scoring module 208) may generate a final score value associated with the digital content item based on the one or more degrees of similarity values between the digital content item and one or more other digital content items. The content treatment system 200 may execute a treatment for the message reported as objectionable based on the final score value associated with the content of the message. For example, the reported (e.g., flagged) message may be moved to the recipient's Blocked Folder on the client device 150.

Figure 3:
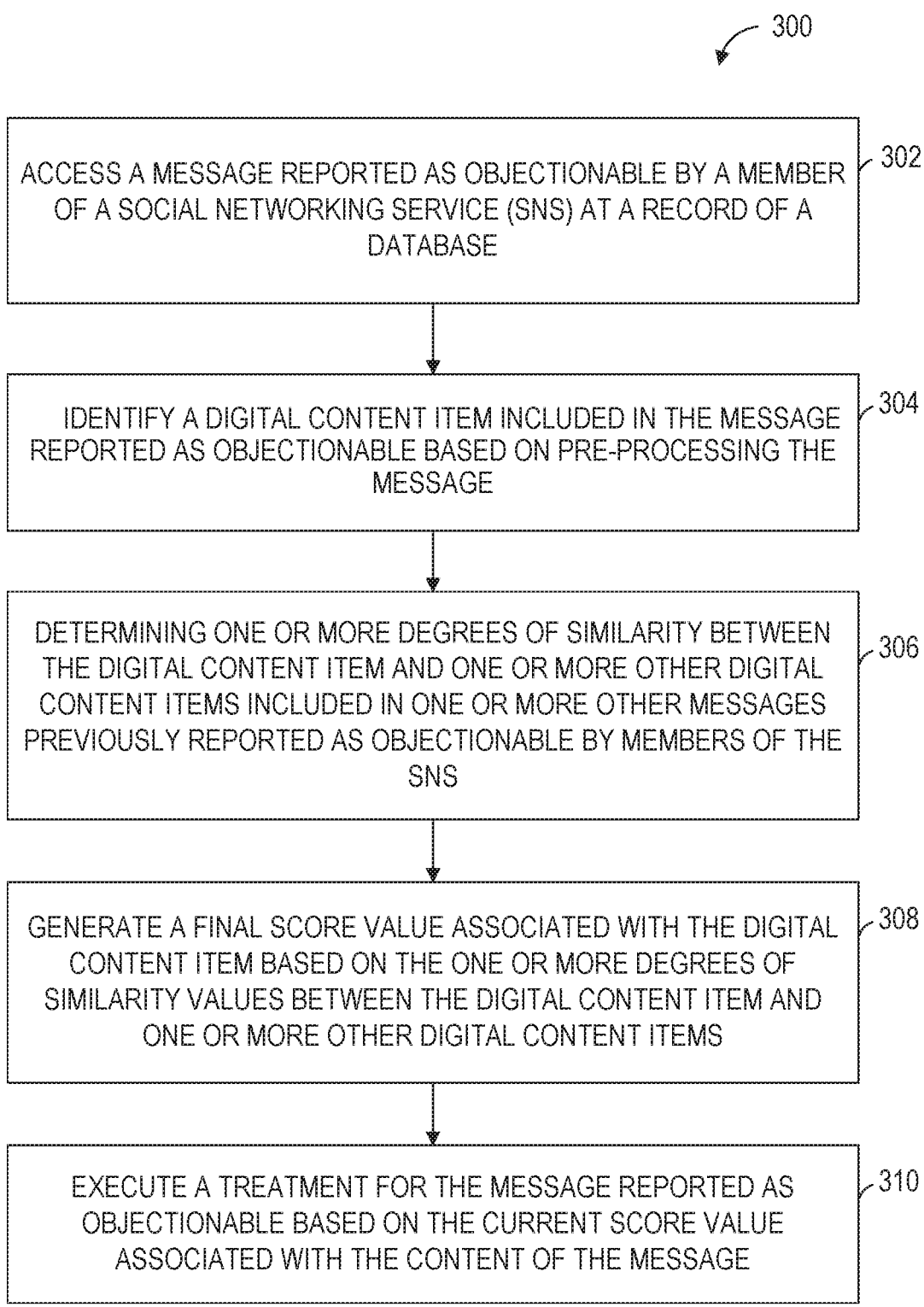
FIG. 3 is a flowchart illustrating a method for high confidence digital content treatment, according to some example embodiments.

FIGS. 3-10 are flowcharts illustrating a method for high confidence digital content treatment, according to some example embodiments. Operations in the method 300 illustrated in FIG. 3 may be performed using modules described above with respect to FIG. 2. As shown in FIG. 3, method 300 may include one or more of method operations 302, 304, 306, 308, and 310, according to some example embodiments.

At operation 302, the access module 202 accesses a message reported as objectionable by a member of the SNS at a record of a database. In some example embodiments, the access module 202 accesses the objectionable message based on a reporting event received from a client device of the member of the SNS. The reporting event may be generated based on an action by the member via a user interface of the client device. The action may correspond to a reporting by the member of the objectionable inbox message to the content treatment system 200. The reporting event may include (or may be associated with) data that identifies the digital content item included in the message reported as objectionable by the member of the SNS.

At operation 304, the content identifying module 204 identifies a digital content item included in the message reported as objectionable based on pre-processing the message.

At operation 306, the objectionable content detection module 206 determines one or more degrees of similarity between the digital content item and one or more other digital content items included in one or more other messages previously reported as objectionable by members of the SNS. The determining of the one or more degrees of similarity may be based on comparing a content of the digital content item and a content of the one or more other digital content items.

At operation 308, the content scoring module 208 generates a final score value associated with the digital content item based on the one or more degrees of similarity values between the digital content item and one or more other digital content items.

At operation 310, the content treatment module 210 executes a treatment for the message reported as objectionable based on the final score value associated with the content of the message.

Further details with respect to the method operations of the method 300 are described below with respect to FIGS. 4-10.

Figure 4:
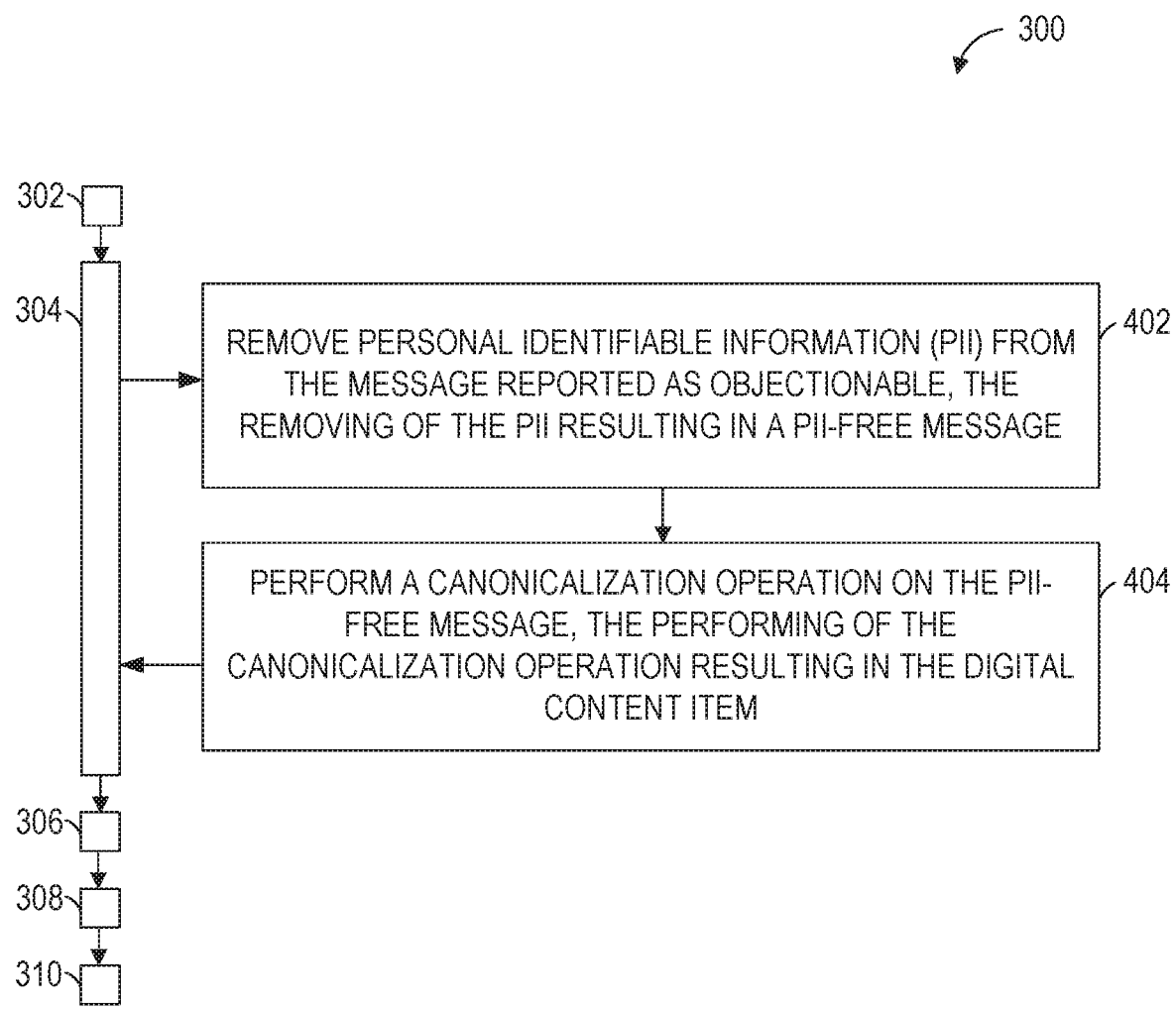
FIG. 4 is a flowchart illustrating a method for high confidence digital content treatment, and representing step 304 of the method illustrated in FIG. 3 in more detail, according to some example embodiments.

As shown in FIG. 4, the method 300 may include one or more method operations 402 or 404, according to some example embodiments. Operation 402 may be performed as part (e.g., a precursor task, a subroutine, or a portion) of operation 304, in which the content identifying module 204 identifies a digital content item included in the message reported as objectionable based on pre-processing the message.

At operation 402, the content identifying module 204 removes Personal Identifiable Information (PII) from the message reported as objectionable. The removing of the PII results in a PII-free message.

At operation 404, the content identifying module 204 performs a canonicalization operation on the PII-free message. The performing of the canonicalization operation results in the digital content item.

Figure 5:
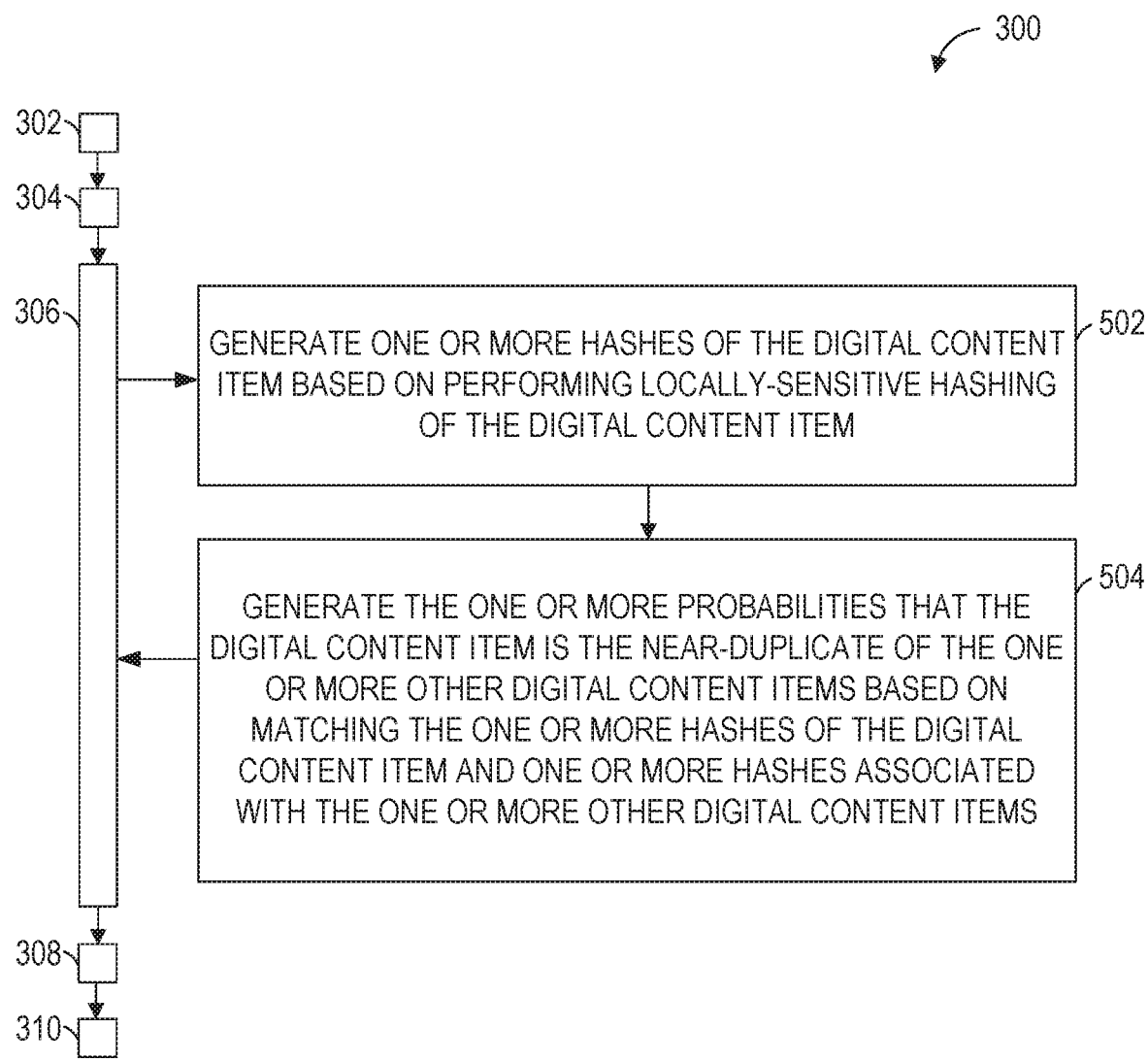
FIG. 5 is a flowchart illustrating a method for high confidence digital content treatment, and representing step 306 of the method illustrated in FIG. 3 in more detail, according to some example embodiments.

As shown in FIG. 5, the method 300 may include one or more method operations 502 or 504, according to some example embodiments. In some example embodiments, the one or more degrees of similarity between the digital content item and the one or more other digital content items are represented by one or more probabilities that the digital content item is a near-duplicate of the one or more other digital content items. Operation 502 may be performed as part (e.g., a precursor task, a subroutine, or a portion) of operation 306 of FIG. 3, in which the objectionable content detection module 206 determines one or more degrees of similarity between the digital content item and one or more other digital content items included in one or more other messages previously reported as objectionable by members of the SNS. At operation 502, the objectionable content detection module 206 generates one or more hashes of the digital content item. The generating of the one or more hashes of the digital content item may he based on performing locality-sensitive hashing of the digital content item.

At operation 504, the objectionable content detection module 206 generates the one or more probabilities that the digital content item is the near-duplicate of the one or more other digital content items based on matching the one or more hashes of the digital content item and one or more hashes associated with the one or more other digital content items (e.g., mapping the one or more hashes of the digital content item to the one or more hashes associated with the one or more other digital content items)

In some example embodiments, the mapping of the hashes is performed based on locality-sensitive hashing, an algorithm for solving the approximate or exact Near Neighbor Search in high dimensional spaces. According to this approach, a message is hashed a plurality of times, so that similar messages are more likely to be hashed to the same bucket of hashes (e.g., group of hashes).

For example, minhash signatures for the user reported messages is accessed, the signature matrix is divided into 'b' bands consisting of 'r' rows each. For each band, there is a hash function that takes vectors of 'r' integers (e.g., the portion of one column within that band) and hashes them to some large number of buckets. The underlying assumption is that most of the dissimilar pairs will never hash to the same bucket.

In sonic example embodiments, the mapping of the hashes is performed based on using a Jaccard Index. The Jaccard coefficient measures similarity between finite sample sets, and is defined as the size of the intersection divided by the size of the union of the sample sets.

Figure 6:
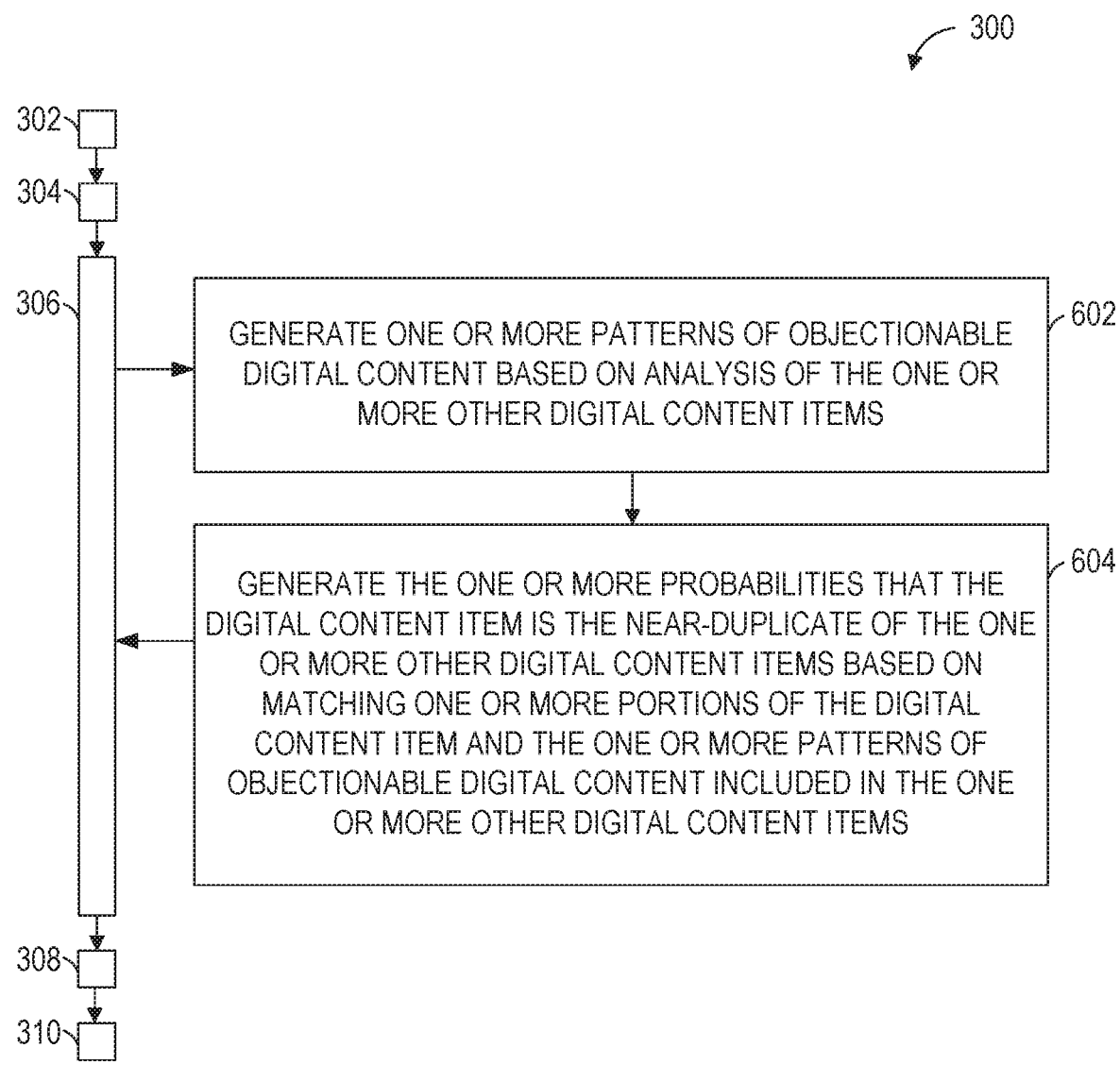
FIG. 6 is a flowchart illustrating a method for high confidence digital content treatment, and representing step 306 of the method illustrated in FIG. 3 in more detail, according to some example embodiments.

As shown in FIG. 6, the method 300 may include one or more method operations 602 or 604, according to some example embodiments. In some example embodiments, the one or more degrees of similarity between the digital content item and the one or more other digital content items are represented by one or more probabilities that the digital content item is a near-duplicate of the one or more other digital content items.

Operation 602 may be performed as part (e.g., a precursor task, a subroutine, or a portion) of operation 306 of FIG. 3, in which the objectionable content detection module 206 determines one or more degrees of similarity between the digital content item and one or more other digital content items included in one or more other messages previously reported as objectionable by members of the SNS. At operation 602, the objectionable content detection module 206 generates one or more patterns of objectionable digital content based on an analysis of the one or more other digital content items. The analysis of the one or more other digital content items may be a textual analysis, an image analysis, a video analysis, etc.

At operation 604, the objectionable content detection module 206 generates the one or more probabilities that the digital content item is the near-duplicate of the one or more other digital content items based on matching one or more portions of the digital content item and the one or more patterns of objectionable digital content included in the one or more other digital content items.

For example, a new user-flagged message may state:
"Dear Shannon,
Your Schwab account has been subjected to a mandatory security update in order to prevent identity theft. Please click the link below to update your account:
http://bzt.z/www.client.schwab.com_LoginSignOn_CustomerCenter_Loginx3/sch/
After you have completed the security update, upload a clear image of your driver's license or international passport on the link below, photo can be taken using a camera phone:
http://bzt.z/www.client.schwab.com_LoginSignOn_CustomerCenter_Loginx3/sch/u pload.php
Failure to secure your account may result to temporary account restriction. Please send me your phone number for further details.
Charles Schwab Support"

An example of previously stored near-duplicate user-flagged message may state:
"Dear Maria,
Your Schwab savings account has been subjected to a mandatory security update in order to prevent identity theft. Please click the link below to update your account:
http://bzt.z/www.client.schwab.com_LoginSignOn_CustomerCenter_Loginx3/sch/"

The objectionable content detection module 206 may generate, based on the previously stored near-duplicate user-flagged message, the pattern "http://bztz/www.clientschwab.com_LoginSignOn_CustomerCenter_Loginx3/sch" and may store the pattern in a record of a database.

The objectionable content detection module 206 may also match the portion
"http://bzt.z/www.client.schwab.com_LoginSignOn_CustomerCenter_Loginx3/sch" in the new user-flagged message to the pattern
"http://bzt.z/www.client.schwab.com_LoginSignOn_CustomerCenter_Loginx3/sch" that was generated based on the previously stored near-duplicate user-flagged message, and may generate a probability (e.g., 100%) that the digital content item included in the new user-flagged message is the near-duplicate of the previously stored near-duplicate user-flagged message based on matching a portion of the digital content item and the pattern generated based on the previously stored near-duplicate user-flagged message.

Figure 7:
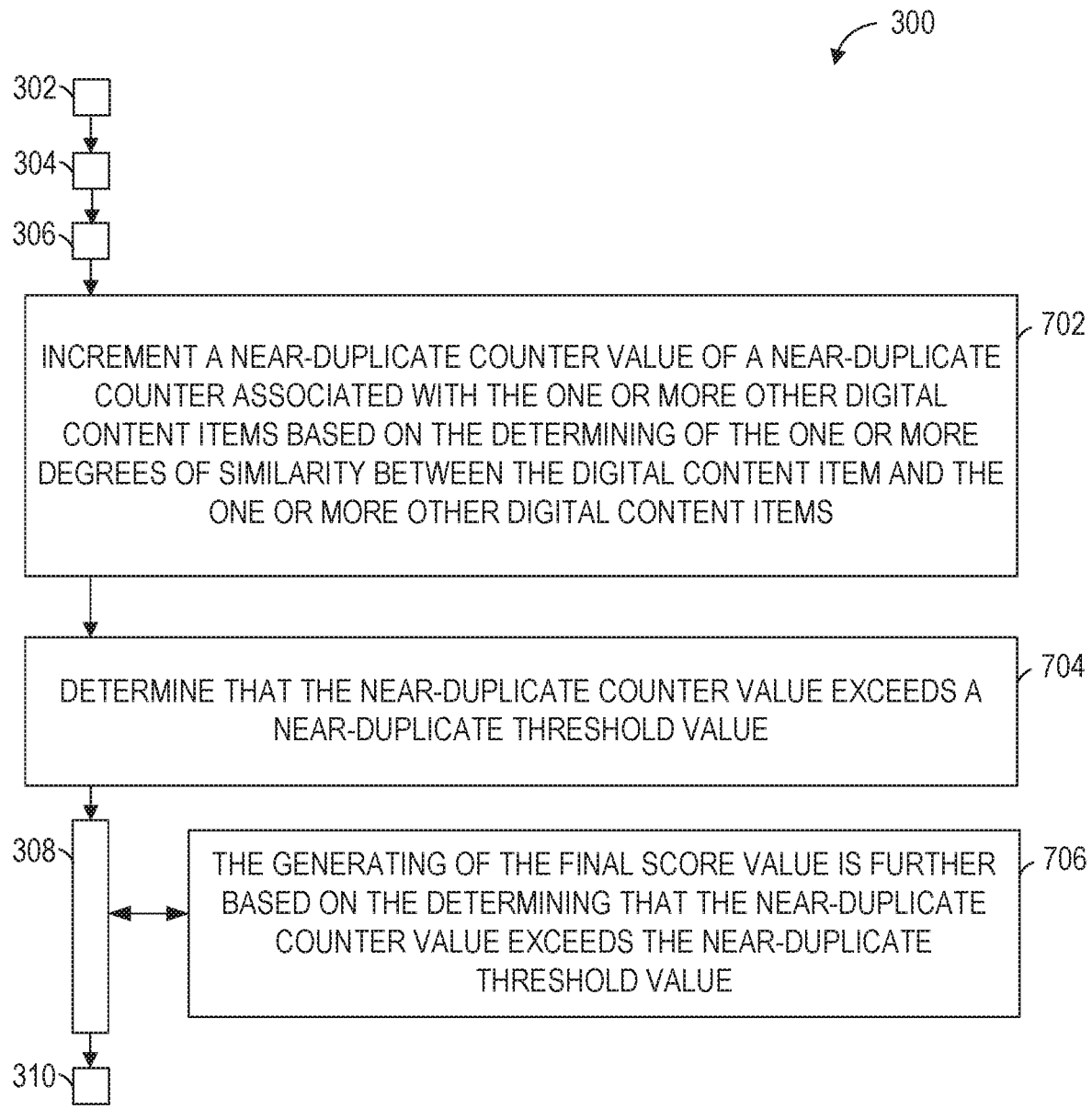
FIG. 7 is a flowchart illustrating a method for high confidence digital content treatment, representing additional steps of the method illustrated in FIG. 3, and representing step 308 of the method illustrated in FIG. 3 in more detail, according to some example embodiments.

As shown in FIG. 7, the method 300 may include operations 702, 704, or 706, according to some example embodiments. Operation 702 may be performed after 306 of FIG. 3, in which the objectionable content detection module 206 determines one or more degrees of similarity between the digital content item and one or more other digital content items included in one or more other messages previously reported as objectionable by members of the SNS.

At operation 702, the objectionable content detection module 206 increments a near-duplicate counter value of a near-duplicate counter associated with the one or more other digital content items based on the determining of the one or more degrees of similarity between the digital content item and the one or more other digital content items. For example, if the degree of similarity between the digital content item (e.g., a first digital content item included in a reported message) and another digital content item (e.g., a second digital content item included in a previously reported message) is 80%, then the near-duplicate counter value of a near-duplicate counter is incremented by "1."

At operation 704, the objectionable content detection module 206 determines that the near-duplicate counter value exceeds a near-duplicate threshold value based on comparing the near-duplicate counter value and the a near-duplicate threshold value.

Operation 706 may be performed as part (e.g., a precursor task, a subroutine, or a portion) of operation 308 of FIG. 3, in which the content scoring module 208 generates a final score value associated with the digital content item based on the one or more degrees of similarity values between the digital content item and one or more other digital content items. At operation 706, the generating of the final score value is further based on the determining that the near-duplicate counter value exceeds the near-duplicate threshold value.

Figure 8:
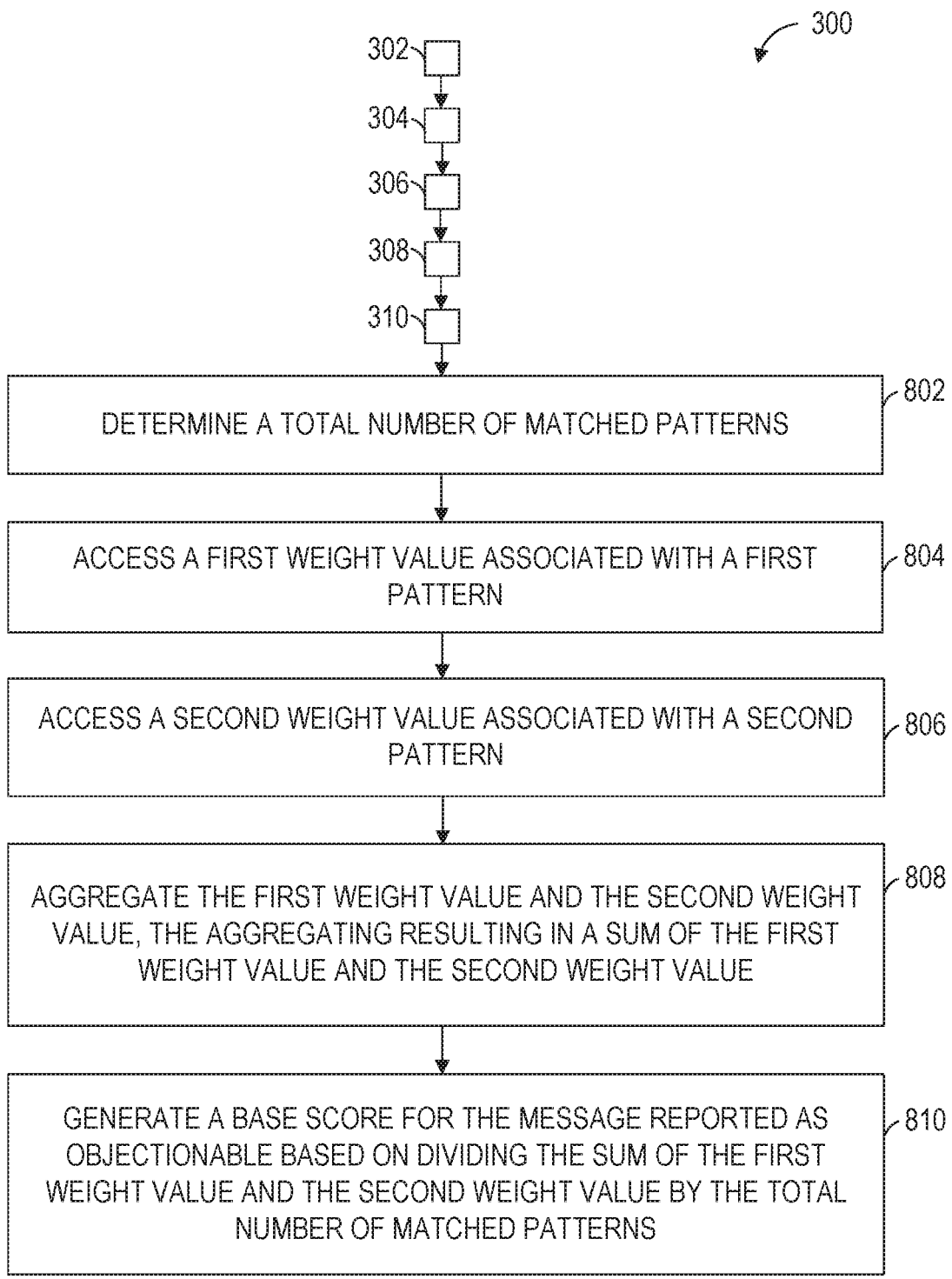
FIG. 8 is a flowchart illustrating a method for high confidence digital content treatment, representing additional steps of the method illustrated in FIG. 3, according to some example embodiments.

As shown in FIG. 8, the method 300 may include one or more operations 802, 804, 806, 808, or 810, according to some example embodiments. Operation 802 may be performed after operation 310 of FIG. 3, in which the content treatment module 210 executes a treatment for the message reported as objectionable based on the final score value associated with the content of the message.

At operation 802, the content scoring module 208 determines a total number of matched patterns based on matching one or more portions of the digital content item and one or more patterns of objectionable digital content included in one or more other messages previously reported as objectionable.

At operation 804, the content scoring module 208 accesses a first weight value associated with a first pattern. The first weight value may be determined based on a number of times the first pattern is included in one or more other messages previously reported as objectionable. In some example embodiments, the one or more other messages previously reported as objectionable include one or more messages identified as spam.

At operation 806, the content scoring module 208 accesses a second weight value associated with a second pattern. The second weight value may be determined based on a number of times the second pattern is included in one or more other messages previously reported as objectionable.

At operation 808, the content scoring module 208 aggregates the first weight value and the second weight value. The aggregating results in a sum of the first weight value and the second weight value.

At operation 810, the content scoring module 208 generates a base score for the message reported as objectionable based on dividing the sum of the first weight value and the second weight value by the total number of matched patterns.

In some example embodiments, the content scoring module 208 associates the base score with the message reported as objectionable in a record of a database.

Figure 9:
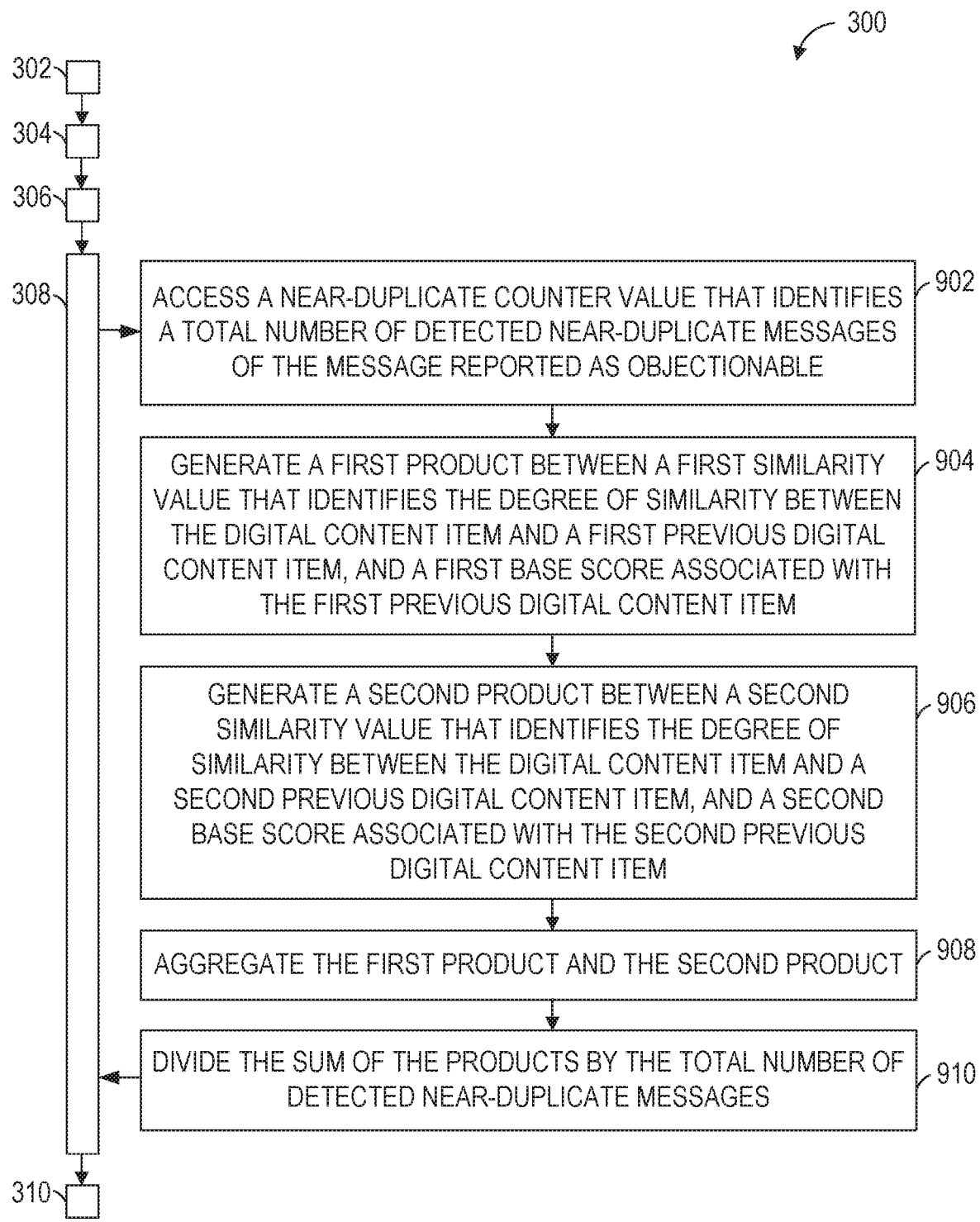
FIG. 9 is a flowchart illustrating a method for high confidence digital content treatment, and representing step 308 of the method illustrated in FIG. 3 in more detail, according to some example embodiments.

As shown in FIG. 9, the method 300 may include one or more of the method operations 902, 904, 906, 908, or 910, according to some example embodiments. Operation 902 may be performed as part (e.g., a precursor task, a subroutine, or a portion) of operation 308 of FIG. 3, in which the content scoring module 208 generates a final score value associated with the digital content item based on the one or more degrees of similarity values between the digital content item and one or more other digital content items.

At operation 902, the content scoring module 208 accesses a near-duplicate counter value at a record of a database. The near-duplicate counter value identifies a total number of detected near-duplicate messages of the message reported as objectionable.

At operation 904, the content scoring module 208 generates a first product between a first similarity value that identifies the degree of similarity between the digital content item and a first previous digital content item, and a first base score associated with the first previous digital content item.

At operation 906, the content scoring module 208 generates a second product between a second similarity value that identifies the degree of similarity between the digital content item and a second previous digital content item, and a second base score associated with the second previous digital content item.

At operation 908, the content scoring module 208 aggregates the first product and the second product. The aggregating results in a sum of the first product and the second product.

At operation 910, the content scoring module 208 divides the sum of the products by the total number of detected near-duplicate messages of the message reported as objectionable. The dividing results in the final score value.

Figure 10:
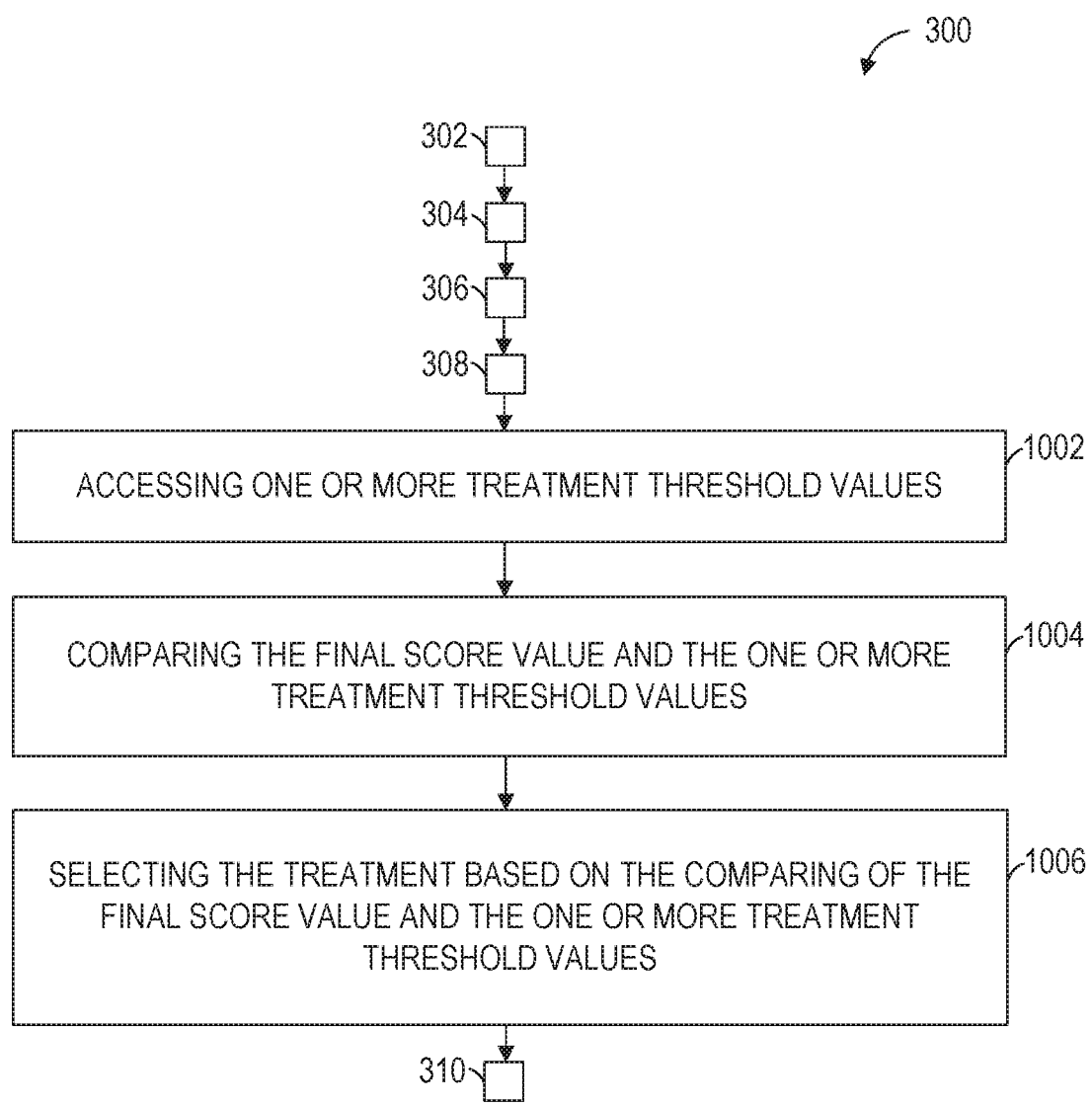
FIG. 10 is a flowchart illustrating a method for high confidence digital content treatment, representing additional steps of the method illustrated in FIG. 3, according to some example embodiments.

As shown in FIG. 10, the method 300 may include one or more of the method operations 1002, 1004, or 1006, according to some example embodiments. Operation 1002 may be performed after operation 308 of FIG. 3, in which the content scoring module 208 generates a final score value associated with the digital content item based on the one or more degrees of similarity values between the digital content item and one or more other digital content items. At operation 1002, the content treatment module 210 accesses one or more treatment threshold values at a record of a database.

At operation 1004, the content treatment module 210 compares the final score value and the one or more treatment threshold values.

At operation 1006, the content treatment module 210 selects the treatment based on the comparing of the final score value and the one or more treatment threshold values.

Example Mobile Device

Figure 11:
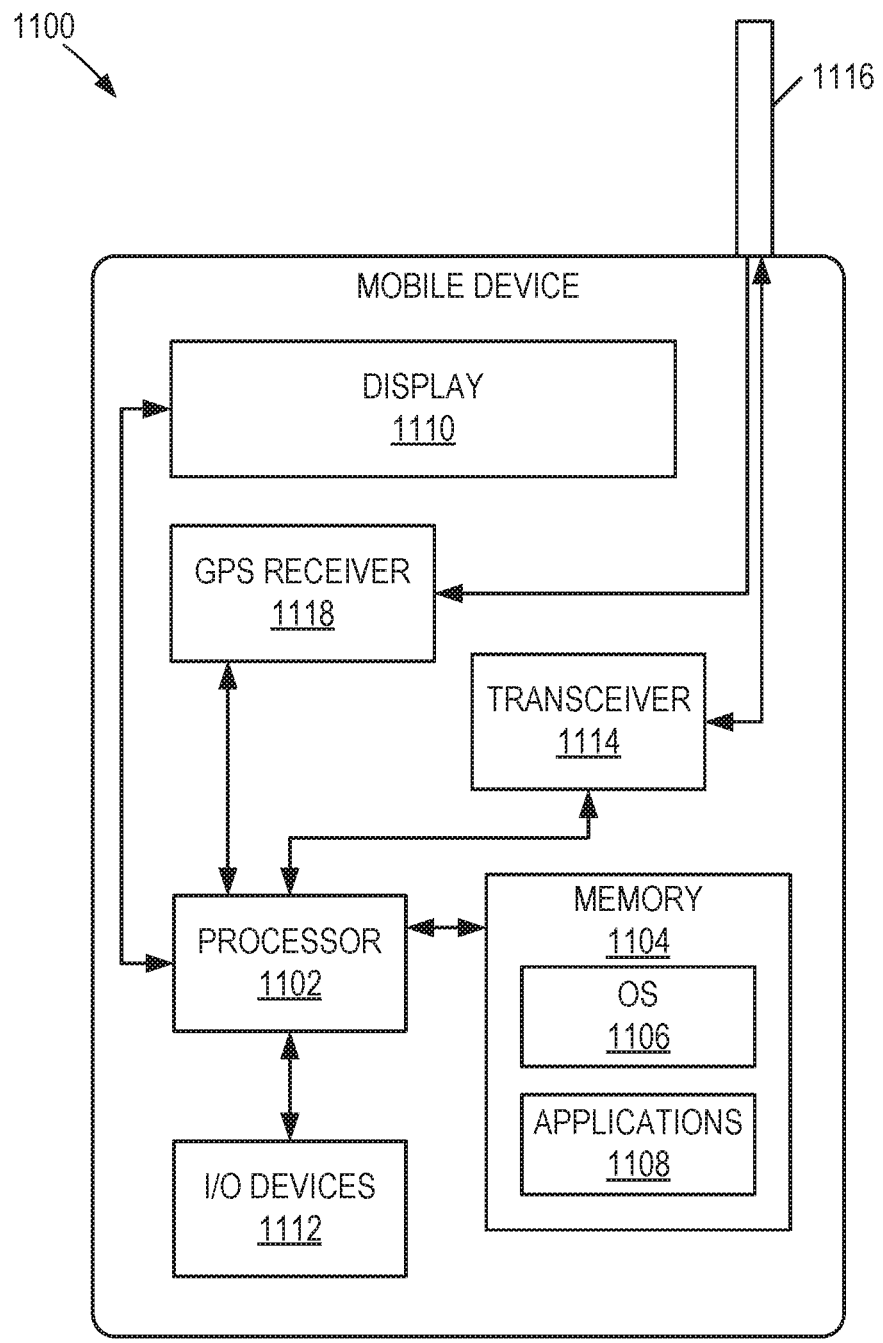
FIG. 11 is a block diagram illustrating a mobile device, according to some example embodiments.

FIG. 11 is a block diagram illustrating a mobile device 1100, according to an example embodiment. The mobile device 1100 may include a processor 1102 The processor 1102 may be any of a variety of different types of commercially available processors 1102 suitable for mobile devices 1100 (for example, an XScale architecture microprocessor, a microprocessor without interlocked pipeline stages (MIPS) architecture processor, or another type of processor 1102 ). A memory 1104, such as a random access memory (RAM), a flash memory, or other type of memory, is typically accessible to the processor 1102. The memory 1104 may be adapted to store an operating system (OS) 1106, as well as application programs 1108, such as a mobile location enabled application that may provide LBSs to a user. The processor 1102 may be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 may be coupled to a transceiver 1114 that interfaces with an antenna 1116. The transceiver 1114 may be configured to both transmit and receive cellular network signals, wireless data signals, or other types of signals via the antenna 1116, depending on the nature of the mobile device 1100. Further, in some configurations, a GPS receiver 1118 may also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
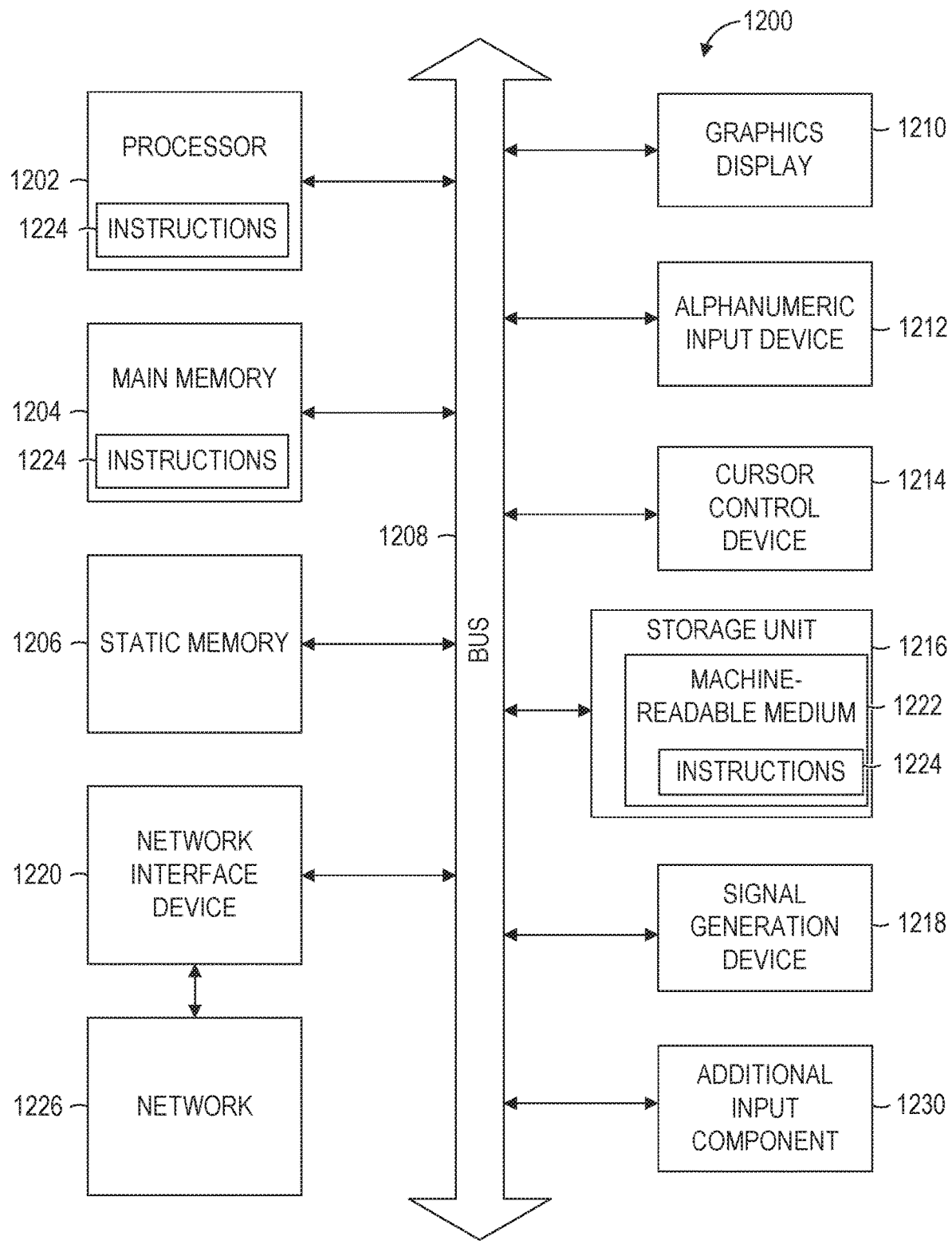
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a. laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine.) Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 1226 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing a message reported as objectionable by a member of a Social Networking Service (SNS) at a record of a database;
identifying a digital content item included in the message reported as objectionable based on pre-processing the message;
determining, using one or more hardware processors, one or more degrees of similarity between the digital content item and one or more other digital content items included in one or more other messages previously reported as objectionable by members of the SNS, the one or more degrees of similarity being determined based on matching one or more portions of the digital content item and one or more patterns of objectionable digital content included in the one or more other digital content items;
generating a final score value associated with the digital content item based on the one or more degrees of similarity values between the digital content item and one or more other digital content items;

executing a treatment for the message reported as objectionable based on the final score value associated with the content of the message;

determining a total number of matched patterns based on matching one or more portions of the digital content item and one or more patterns of objectionable digital content included in one or more other messages previously reported as objectionable;

accessing a first weight value associated with a first pattern, the first weight value being determined based on a number of times the first pattern is included in one or more other messages previously reported as objectionable;

accessing a second weight value associated with a second pattern, the second weight value being determined based on a number of times the second pattern is included in one or more other messages previously reported as objectionable;

aggregating the first weight value and the second weight value, the aggregating resulting in a sum of the first weight value and the second weight value; and generating a base score for the message reported as objectionable based on dividing the sum of the first weight value and the second weight value by the total number of matched patterns.

2. The method of claim 1, wherein the identifying of the digital content item based on the pre-processing of the message includes:

removing Personal Identifiable Information (PII) from the message reported as objectionable, the removing of the PII resulting in a PII-free message, and performing a canonicalization operation on the PII-free message, the performing of the canonicalization operation resulting in the digital content item.

3. The method of claim 1, wherein the one or more degrees of similarity between the digital content item and the one or more other digital content items are represented by one or more probabilities that the digital content item is a near-duplicate of the one or more other digital content items, and wherein the determining of the one or more degrees of similarity between the digital content item and the one or more other digital content items includes:

generating one or more hashes of the digital content item based on performing locality-sensitive hashing of the digital content item; and generating the one or more probabilities that the digital content item is the near-duplicate of the one or more other digital content items based on matching the one or more hashes of the digital content item and one or more hashes associated with the one or more other digital content items.

4. The method of claim 1, wherein the one or more degrees of similarity between the digital content item and the one or more other digital content items are represented by one or more probabilities that the digital content item is a near-duplicate of the one or more other digital content items, and wherein the determining of the one or more degrees of similarity between the digital content item and the one or more other digital content items includes:

generating one or more patterns of objectionable digital content based on an analysis of the one or more other digital content items, and generating the one or more probabilities that the digital content item is the near-duplicate of the one or more other digital content items based on matching one or more portions of the digital content item and the one or more patterns of objectionable digital content included in the one or more other digital content items.

5. The method of claim 1, further comprising:

accessing a reporting event based on a communication received from a client device, the communication pertaining to the message reported as objectionable by the member, the client device being associated with the member, wherein the accessing of the message reported as objectionable by the member is based on the accessing of the reporting event.

6. The method of claim 1, further comprising:

incrementing a near-duplicate counter value of a near-duplicate counter associated with the one or more other digital content items based on the determining of the one or more degrees of similarity between the digital content item and the one or more other digital content items; and determining that the near-duplicate counter value exceeds a near-duplicate threshold value.

7. The method of claim 6, wherein the generating of the final score value is further based on the determining that the near-duplicate counter value exceeds the near-duplicate threshold value.

8. The method of claim 6, further comprising: tagging a previously-reported objectionable message as a spam message in a record of a database based on the determining that the near-duplicate counter value exceeds the near-duplicate threshold value.

9. The method of claim 1, wherein the one or more other messages previously reported as objectionable include one or more messages identified as spam.

10. The method of claim 1, further comprising: associating the base score with the message reported as objectionable in a record of a database.

11. The method of claim 1, wherein the generating of the final score value includes:

accessing a near-duplicate counter value at a record of a database, the near-duplicate counter value identifying a total number of detected near-duplicate messages of the message reported as objectionable;

generating a first product between a first similarity value that identifies the degree of similarity between the digital content item and a first previous digital content item, and a first base score associated with the first previous digital content item;

generating a second product between a second similarity value that identifies the degree of similarity between the digital content item and a second previous digital content item, and a second base score associated with the second previous digital content item;

aggregating the first product and the second product, the aggregating resulting in a sum of the first product and the second product; and dividing the sum of the products by the total number of detected near-duplicate messages of the message reported as objectionable, the dividing resulting in the final score value.

12. The method of claim 1, further comprising:

accessing one or more treatment threshold values at a record of a database;

comparing the final score value and the one or more treatment threshold values; and selecting the treatment based on the comparing of the final score value and the one or more treatment threshold values.

13. A system comprising:
one or more hardware processors; and
a machine-readable medium for storing instructions that, when executed by the one or more hardware processors, cause the one or more hardware processors to perform operations comprising:
accessing a message reported as objectionable by a member of a Social Networking Service (SNS) at a record of a database;
identifying a digital content item included in the message reported as objectionable based on pre-processing the message;
determining one or more degrees of similarity between the digital content item and one or more other digital content items included in one or more other messages previously reported as objectionable by members of the SNS, the one or more degrees of similarity being determined based on matching one or more portions of the digital content item and one or more patterns of objectionable digital content included in he one or more other digital content items;
generating a final score value associated with the digital content item based on the one or more degrees of similarity values between the digital content item and one or more other digital content items;
executing a treatment for the message reported as objectionable based on the final score value associated with the content of the message;
determining a total number of matched patterns based on matching one or more portions of the digital content item and one or more patterns of objectionable digital content included in one or more other messages previously reported as objectionable;
accessing a first weight value associated with a first pattern, the first weight value being determined based on a number of times the first pattern is included in one or more other messages previously reported as objectionable;
accessing a second weight value associated with a second pattern, the second weight value being determined based on a number of times the second pattern is included in one or more other messages previously reported as objectionable;
aggregating the first weight value and the second weight value, the aggregating resulting in a sum of the first weight value and the second weight value, and
generating a base score for the message reported as objectionable based on dividing the sum of the first weight value and the second weight value by the total number of matched patterns.

14. The system of claim 13, wherein the identifying of the digital content item based on the pre-processing of the message includes:
removing Personal Identifiable information (PII) from the message reported as objectionable, the removing of the PII resulting in a PII-free message, and
performing a canonicalization operation on the PII-free message, the performing of the canonicalization operation resulting in the digital content item.

15. The system of claim 13, wherein the one or more degrees of similarity between the digital content item and the one or more other digital content items are represented by one or more probabilities that the digital content item is a near-duplicate of the one or more other digital content items, and
wherein the determining of the one or more degrees of similarity between the digital content item and the one or more other digital content items includes:
generating one or more hashes of the digital content item based on performing locality-sensitive hashing of the digital content item; and
generating the one or more probabilities that the digital content is the near-duplicate of the one or more other digital content items based on matching the one or more hashes of the digital content item and one or more hashes associated with the one or more other digital content items.

16. The system of claim 13, wherein the one or more degrees of similarity between the digital content item and the one or more other digital content items are represented by one or more probabilities that the digital content item is a near-duplicate of the one or more other digital content items, and
wherein the determining of the one or more degrees of similarity between the digital content item and the one or more other digital content items includes:
generating one or more patterns of objectionable digital content based on an analysis of the one or more other digital content items, and
generating the one or more probabilities that the digital content item is the near-duplicate of the one or more other digital content items based on matching one or more portions of the digital content item and the one or more patterns of objectionable digital content included in the one or more other digital content items.

17. The system of claim 13, wherein the operations further comprise:
determining a total number of matched patterns based on matching one or more portions of the digital content item and one or more patterns of objectionable digital content included in one or more other messages previously reported as objectionable;
accessing a first weight value associated with a first pattern, the first weight value being determined based on a number of times the first pattern is included in one or more other messages previously reported as objectionable;
accessing a second weight value associated with a second pattern, the second weight value being determined based on a number of times the second pattern is included in one or more other messages previously reported as objectionable;
aggregating the first weight value and the second weight value, the aggregating resulting in a sum of the first weight value and the second weight value; and
generating a base score for the message reported as objectionable based on dividing the sum of the first weight value and the second weight value by the total number of matched patterns.

18. The system of claim 13, wherein the generating of the final score value includes:
accessing a near-duplicate counter value at a record of a database, the near-duplicate counter value identifying a total number of detected near-duplicate messages of the message reported as objectionable;
generating a first product between a first similarity value that identifies the degree of similarity between the digital content item and a first previous digital content item, and a first base score associated with the first previous digital content item;
generating a second product between a second similarity value that identifies the degree of similarity between the digital content item and a second previous digital content item, and a second base score associated with the second previous digital content item;

aggregating the first product and the second product, the aggregating resulting in a sum of the first product and the second product; and dividing the sum of the products by the total number of detected near-duplicate messages of the message reported as objectionable, the dividing resulting in the final score value.

19. A non-transitory machine-readable storage medium comprising instructions that, when executed by one or more hardware processors of a machine, cause the one or more hardware processors to perform operations comprising:

accessing a message reported as objectionable by a member of a Social Networking Service (SNS) at a record of a database;

identifying a digital content item included in the message reported as objectionable based on pre-processing the message;

determining one or more degrees of similarity between the digital content item and one or more other digital content items included in one or more other messages previously reported as objectionable by members of the SNS, the one or more degrees of similarity being determined based on matching one or more portions of the digital content item and one or more patterns of objectionable digital content included in the one or more other digital content items;

generating a final score value associated with the digital content item based on the one or more degrees of similarity values between the digital content item and one or more other digital content items;

executing a treatment for the message reported as objectionable based on the final score value associated with the content of the message;

determining a total number of matched patterns based on mathing one or more portions of the digital content item and one or more patterns of objectionable digital content included in one or more other messages previously reported as objectionable;

accessing a first weight value associated with a first pattern, the first weight value being determined based on a number of times the first pattern is included in one or more other messages previously reported as objectionable;

accessing a second weight value associated with a second pattern, the second weight value being determined based on a number of times the second pattern is included in one or more other messages previously reported as objectionable;

aggregating the first weight value and the second weight value, the aggregating resulting in a sum of the first weight value and the second weight value; and generating a base score for the message reported as objectionable based on dividing the sum of the first weight value and the second weight value by the total number of matched patterns.

* * * * *